United States Patent
Hsiao et al.

(10) Patent No.: US 6,919,280 B2
(45) Date of Patent: Jul. 19, 2005

(54) METHOD OF REMOVING MAGNETORESISTIVE SENSOR CAP BY REACTIVE ION ETCHING

(75) Inventors: Richard Hsiao, San Jose, CA (US); Wipul Pemsiri Jayasekara, Los Gatos, CA (US); Son Van Nguyen, Los Gatos, CA (US); Sue Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 170 days.

(21) Appl. No.: 10/271,804

(22) Filed: Oct. 15, 2002

(65) Prior Publication Data

US 2004/0069746 A1 Apr. 15, 2004

(51) Int. Cl.[7] ................ H01L 21/302; H01L 21/461
(52) U.S. Cl. .................. 438/710; 438/712; 438/722
(58) Field of Search .................. 438/710, 712, 438/722; 360/113; 204/192.34, 192.35

(56) References Cited

U.S. PATENT DOCUMENTS

| | | | |
|---|---|---|---|
| 5,491,600 A | 2/1996 | Chen et al. | 360/113 |
| 5,883,764 A | 3/1999 | Pinarbasi | 360/113 |
| 6,030,753 A | 2/2000 | Lin | 430/314 |
| 6,064,552 A | 5/2000 | Iwasaki et al. | 360/113 |
| 6,086,777 A * | 7/2000 | Cheng et al. | 216/67 |
| 6,118,621 A | 9/2000 | Ohsawa et al. | 360/113 |
| 6,209,193 B1 | 4/2001 | Hsiao | 29/603.15 |
| 6,315,875 B1 | 11/2001 | Sasaki | 204/192.34 |
| 6,555,461 B1 * | 4/2003 | Woo et al. | 438/622 |
| 2001/0004797 A1 | 6/2001 | Hsiao | 29/603.07 |
| 2002/0132488 A1 * | 9/2002 | Nallan | 438/720 |

OTHER PUBLICATIONS

IBM TDB vol. 39, No. 4, Apr. 1996: Continuous Spacer Spin Valve Structure; Fontana Jr., RE; Burney, BA; Speriosu, VS; Tsang, C.

RD n440, Dec. 2000, Article 152, p. 2198; Flux Guide/Tunnel Valve Structure with Conducting Contiguous Junction; Gill, H; Werner, D.

n429, Jan. 2000, Article 163, Robust Insulating Contiguous Junction p. 197: Hsiao, R; Fontana, R.

n449, Sep. 2001, Article 119, p. 1571, Zero Net Magnetization for Leap Overlap Region for Lead Overlay Head; Gill, H.

* cited by examiner

*Primary Examiner*—Duy-Vu N. Deo
(74) *Attorney, Agent, or Firm*—Lewis L. Nunnelley

(57) ABSTRACT

During manufacture, a magnetoresistive sensor having a ferromagnetic free layer is commonly provided with a tantalum cap layer. The tantalum cap layer provides protection to the sensor during manufacture and then is typically removed after performing annealing. The removal of the tantalum cap with a fluorine reactive ion etch leaves low volatility tantalum/fluorine byproducts. The present invention provides a method of using an argon/hydrogen reactive ion etch to remove the tantalum/fluorine byproducts. The resulting sensor has far less damage resulting from the presence of the fluorine byproducts.

7 Claims, 9 Drawing Sheets

METHOD OF REMOVING MAGNETORESISTIVE SENSOR CAP BY REACTIVE ION ETCHING

BACKGROUND OF THE INVENTION

1. Field of the Invention

The present invention relates in general to a magnetoresistive sensor used, for example, in computer disk drives; and, more specifically to a method for removing a cap on the sensor during manufacture.

2. Description of the Background Art

Magnetoresistive sensors are commonly used in magnetic disk drives. Disk drives using magnetic recording of digital information store most of the information in contemporary computer systems. A disk drive has at least one rotating disk with discrete concentric tracks of data. Each disk drive also has at least one recording head typically having a separate write element and read element, typically a magnetoresistive sensor. The recording head is constructed on a slider and the slider is attached to a suspension. The combination of the recording head, slider, and suspension is called a head gimbal assembly. In addition, there is an actuator which positions the recording head over the specific track of interest. The actuator first rotates to seek the track of interest and after positioning the recording head over the track, maintains the recording head in close registration to that track. The disk in a disk drive has a substrate and a magnetic layer on the substrate for magnetic recording. The slider carrying the recording head has a disk facing surface upon which an air bearing is constructed. The air bearing allows the slider to float on a cushion of air and to be positioned close to the disk surface. Alternatively, the slider surface facing the disk can be adapted for partial or continuous contact with the disk.

As the density of recorded information continually increases, the read element must become smaller and more sensitive. It is very challenging to achieve an increase in sensitivity for small read elements. Any process step in the manufacture of read elements which results in a significant loss of sensitivity may be tolerated for large sensors but, in general, is less acceptable for small sensors.

A magnetoresistive sensor is widely used as the read element in magnetic recording applications. A magnetoresistive sensor is also used as the storage element in magnetic random access memory arrays (MRAM). Most contemporary magnetoresistive sensors are based on the external field modulation of spin dependent transport of electrons through a stack of thin films. This modulation of electron transport through the sensor may be measured by passing sense current though the sensor to determine the effective resistance. The current used to sense the changes in the sensor may be within the plane of the sensor stack (called an current-in-plane or CIP sensor). Giant magnetoresistive (GMR) sensors, also called spin valve sensors, are typically CIP sensors. Another type of magnetoresistive sensor employs sense current which is perpendicular to the sensor stack (called CPP sensors). Tunnel junction magnetoresistive sensors are typically configured as CPP sensors.

During the construction of a magnetoresistive sensor, a stack of thin films is formed and then typically a capping layer of tantalum is formed over the stack of thin films. The tantalum layer protects the sensor stack from damage during subsequent processing, including annealing. In some sensor fabrication methods, the tantalum layer may be completely or partially removed before subsequent steps such as the formation of electrical leads. Although tantalum is an excellent material for protecting the sensor stack, it is a difficult material to remove without causing damage to the underlying sensor. The tantalum layer may be removed by ion milling. However ion milling is not selective for only tantalum, and is usually energetic enough to cause damage to the sensor stack. Lower energy, selective reactive ion etching may also be used. A fluorine reactive ion etch (RIE) is effective in removing tantalum. However the tantalum-fluorine byproducts formed during the RIE have very low volatility. Accordingly, after fluorine reactive ion etching, the surface of the sensor stack usually has appreciable amounts of residual tantalum-fluorine byproducts. This residue can serve to initiate corrosion, reduce exchange coupling strength, can increase the electrical resistance between the sensor stack and the subsequently formed electrical leads, and can result in a loss of sensitivity.

Thus a method for removing the tantalum cap from a magnetoresistive sensor is needed which minimizes damage to the sensor and leaves a clean surface upon which subsequent layers may be formed.

SUMMARY OF THE INVENTION

The preferred embodiment of the present invention provides a method of using an argon/hydrogen RIE treatment to remove any tantalum or fluorine byproducts which remain after removal of a tantalum capping layer from a magnetoresistive sensor. The preferred embodiment provides a method which minimizes damage to the underlying free layer such as magnetic moment loss. The preferred embodiment also leaves a clean surface on the sensor which is free of corrosion initiators.

In a preferred embodiment of the invention, a method for removing a tantalum cap on a magnetoresistive sensor is provided including forming a magnetoresistive stack, forming a tantalum cap on the magnetoresistive stack, removing the tantalum cap with a fluorine RIE, and cleaning the surface of the magnetoresistive sensor with an argon/hydrogen RIE treatment. The fluorine RIE may be performed in a low energy environment with a gas mixture of $CHF_3$ and $CF_4$. The argon/hydrogen RIE treatment may be performed in a low energy environment with a gas mixture of argon and hydrogen. The preferred embodiment of the method is applicable to sensors used in magnetic recording and to sensors used in MRAM.

Other aspects and advantages of the present invention will become apparent from the following detailed description, which when taken along with the illustrations, illustrate by way of example the principles of the invention.

DETAILED DESCRIPTION OF THE INVENTION

The present invention provides a novel method of removing the tantalum capping layer in a magnetoresistive sensor which results in significantly less damage to the sensor and provides a very clean surface upon which to form electrical leads. The method significantly reduces the magnetic moment loss in the sensor. The preferred embodiment of the method is particularly important when manufacturing small sensors wherein any appreciable loss in sensitivity is detrimental.

Figure 1:
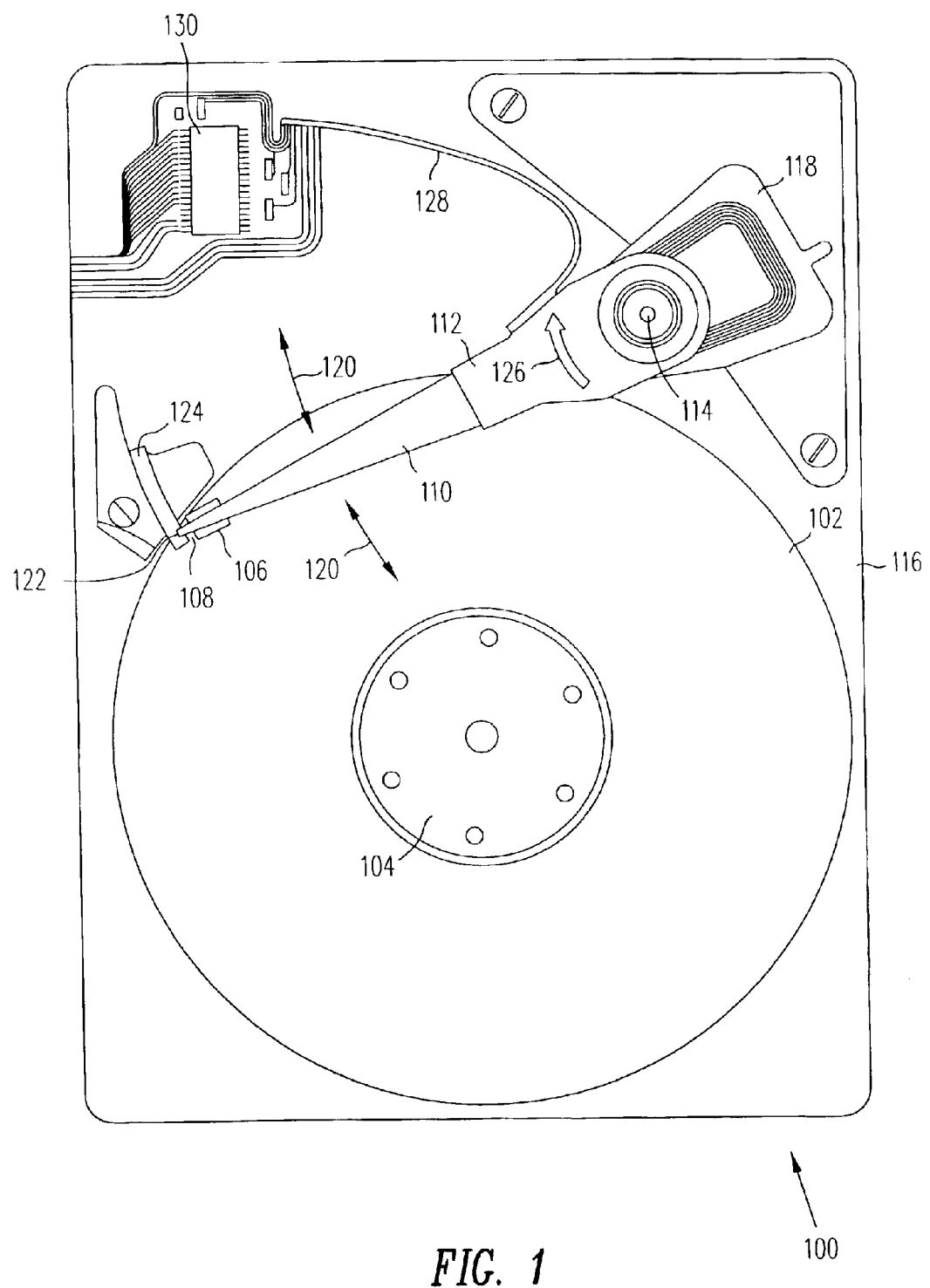
FIG. 1 illustrates a disk drive using a magnetoresistive sensor as the readback element.

Referring to FIG. 1, a magnetic disk drive 100 has at least one rotatable magnetic disk 102 supported by a spindle 104 and rotated by a motor (not shown). There is at least one slider 106 with an attached recording head 108 positioned over the disk 102 surface while reading and writing. The slider 106 is attached to a suspension 110 and the suspension 110 is attached to an actuator 112. The actuator 112 is pivotally attached 114 to the housing 116 of the disk drive 100 and is driven by a voice coil motor 118. As the disk is rotating, the actuator 112 positions the slider 106 along with the suspension 110 radially or along an arcuate path 120 over the disk 102 surface to access the data track of interest.

Referring to FIG. 1, during operation of the disk drive 100, the motion of the rotating disk 102 relative to the slider 106 generates an air bearing between the slider 106 and the disk 102 surface which exerts an upward force on the slider 106. The upward force is balanced by a spring force from the suspension 110 urging the slider 106 toward the surface of the disk 102. Alternatively, the slider 106 may be in either partial or continuous contact with the disk 102 surface during operation.

Figure 2:
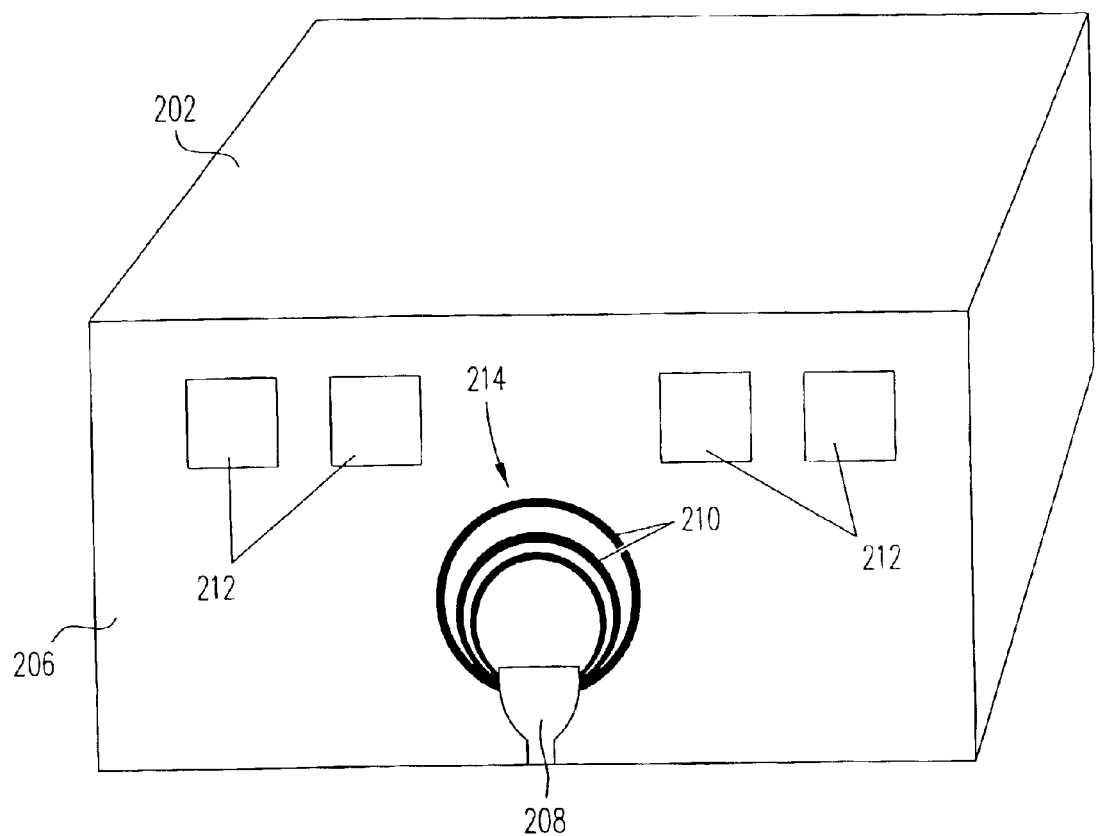
FIG. 2 illustrates a slider with an attached recording head.

FIG. 2 illustrates a more detailed view of a slider 202. The recording head is preferably constructed on the trailing surface 206 of the slider 202. FIG. 2 illustrates the upper pole 208 and the turns 210 of the coil 214 of the write element of the recording head. The read element is not illustrated in FIG. 2. The electrical connection pads 212 which allow connection with the write element and read element are illustrated.

Figure 3:
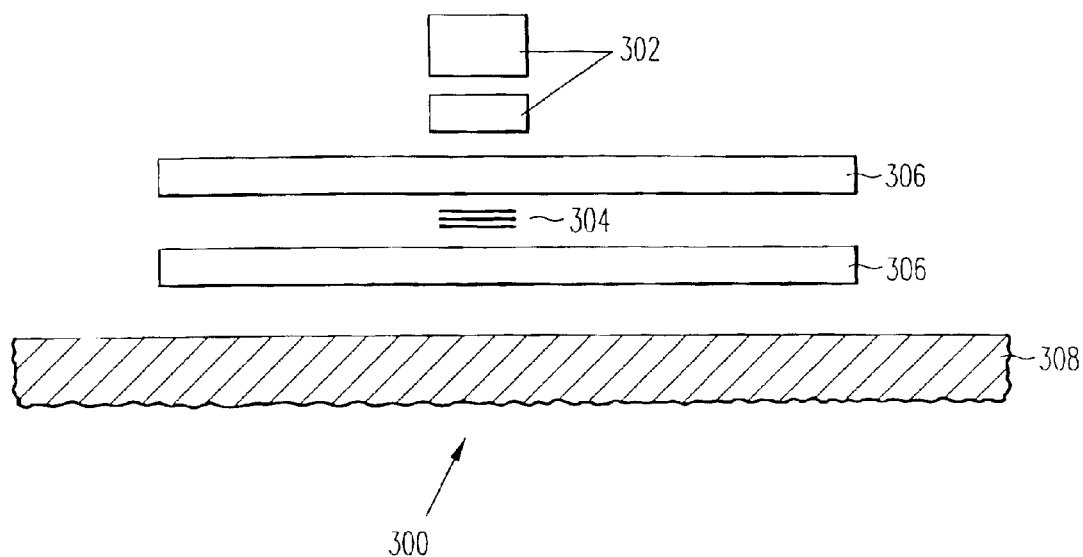
FIG. 3 illustrates a view of the active portions of a recording head.

FIG. 3 illustrates a view of the magnetically active portion of a recording head 300 from the disk facing side of the slider. The poles tips 302 of the write element are illustrated. The read element 304 is a sandwich structure of several thin films. The sensor 304 sandwich structure is also known as the sensor stack. The sensor stack 304 is placed between two magnetic shields 306 which improves the spatial resolution of the readback signal. The recording head is constructed using the slider body 308 as the substrate.

Magnetoresistive sensors may have various forms and structures. A common aspect of most structures is that a tantalum cap is used during manufacture. Two specific embodiments of the present invention are be discussed below. It is understood that these two embodiments are exemplary, and that one skilled in the art will recognize the applicability of the present invention to other sensor designs and structures.

Figure 4A:
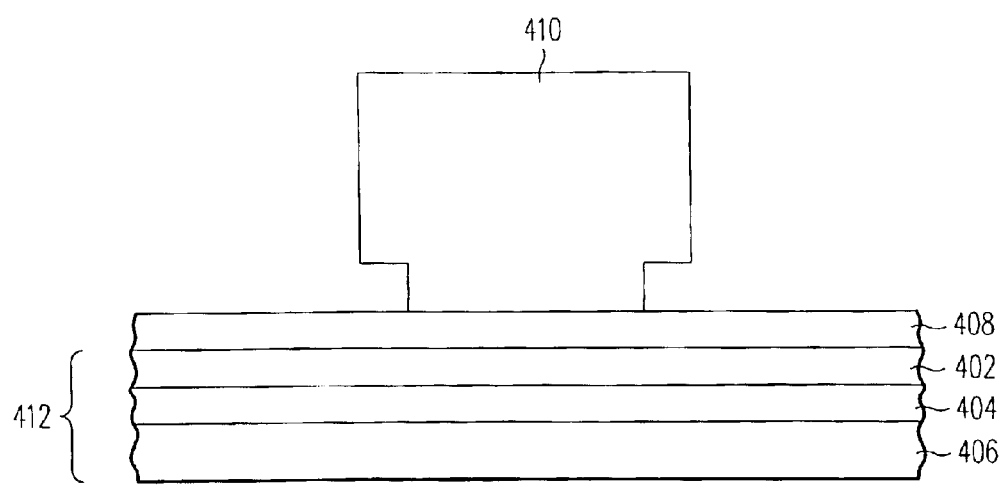
FIG. 4a illustrates the formation of a magnetoresistive sensor stack, tantalum cap, and patterned photoresist.

The first embodiment of the present invention is illustrated in FIGS. 4a–d. The embodiment illustrated in FIG. 4 is a method of manufacturing a GMR sensor in which a ferromagnetic free layer 402 is magnetically stabilized with exchange tabs (described in detail below). FIG. 4a illustrates a GMR stack 412 which has been formed over a substrate (not shown). The GMR stack 412 includes a pinned layer 406, a nonmagnetic conducting layer 404, and a free layer 402. The free layer 402 is the uppermost layer of the GMR stack 412. A tantalum layer 408 has been formed over the GMR stack 412. And finally a patterned photoresist layer 410 has been formed over the tantalum layer 408.

Figure 4B:
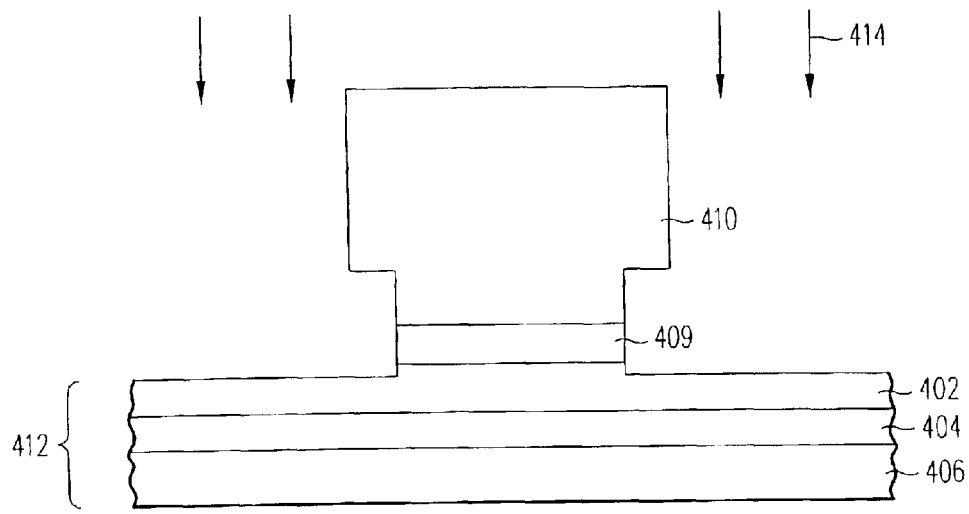
FIG. 4b illustrates the sensor stack as a fluorine RIE is performed.

FIG. 4b illustrates the use of a fluorine reactive ion etch (RIE) 414 to remove the exposed portion of the tantalum layer 408. Only the portion 409 of the tantalum layer 408 which is protected by the photoresist 410 remains after the fluorine RIE 414. A small amount of the exposed free layer 402 may also be removed during the fluorine RIE 414. Typical conditions for performing a fluorine RIE includes using a gas with a mixture of $CHF_3$ in a range of about 0 to 50 sccm and $CF_4$ in a range of about 10 to 40 sccm at a pressure of less than about 10 mTorr. In a plasma inductive coupling system the coil power can typically be about 100 to 500 watts, the RF power can be about 5 to 50 watts, and the magnitude of the RF bias typically should be less than about 150 V. Under these conditions a typical blanket tantalum etch rate is about 150 to 500 Angstroms per minute.

Figure 4C:
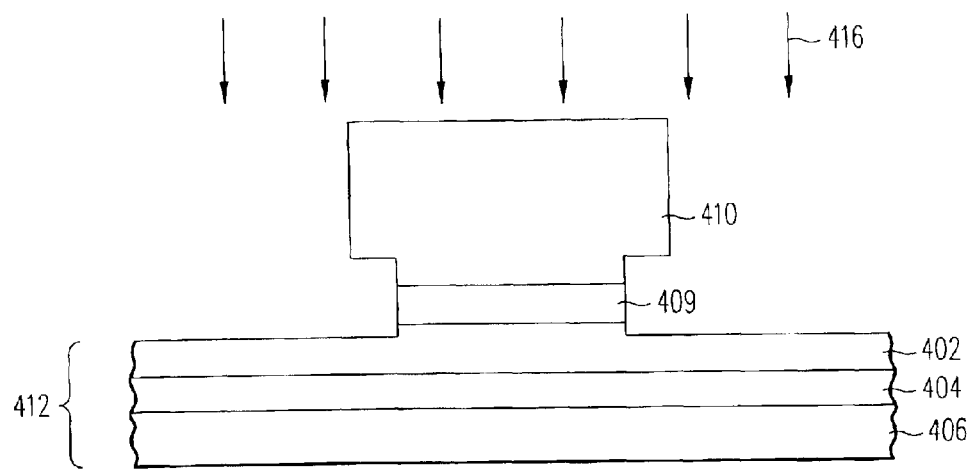
FIG. 4c illustrates the sensor stack as an argon/hydrogen RIE treatment is performed.

FIG. 4c illustrates the use of a cleaning step using an argon/hydrogen RIE treatment 416. The use of a argon/hydrogen RIE treatment 416 removes any tantalum/fluorine byproducts remaining after the fluorine RIE 414. The preferred RIE treatment conditions include using a gas with a mixture of argon and hydrogen in a range of about 25 to 75 sccm with a pressure of less than 150 mTorr and preferably about 10 to 100 mTorr. The amount of hydrogen in the gas mixture is not critical and can range from as low as 2% by volume to nearly 100%. The coil power may be about 50 to 500 watts; the RF power is typically less than about 10 watts; and, the magnitude of RF bias is preferably less than about 50 volts. The very low bias is preferred to prevent any underlayer sputtering.

Figure 4D:
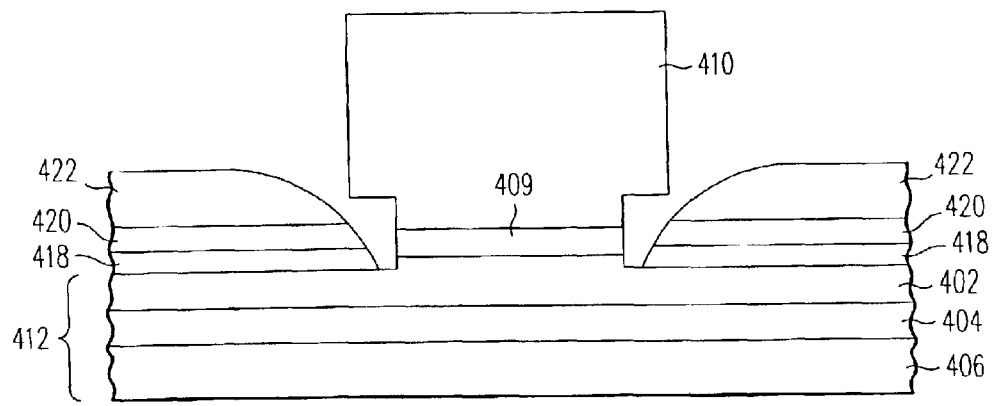
FIG. 4d illustrates the sensor stack after formation of an exchange layer and electrical leads.

FIG. 4d illustrates the subsequent formation of exchange tabs and electrical leads after the argon/hydrogen RIE treatment 416 is performed. Typically a small amount of additional ferromagnetic material 418 may be added to the existing exposed ferromagnetic material of the free layer 402. Then an antiferromagnetic material 420 such as PtMn, NiMn, and IrMn is formed over the exposed portion of the free layer 402. Finally electrical leads 422 are formed. The antiferromagnetic layer 420 exchange couples with the ferromagnetic layer 418. Accordingly, the antiferromagnetic layer 420 and the coupled portions of the free layer 402 are referred to as exchange tabs. The removal of any residual tantalum/fluorine byproducts with the argon/hydrogen RIE treatment is particularly important when forming the exchange tab GMR structure. Any remaining fluorine residue may reduce the exchange field and increase the lead resistance, thus effectively reducing the sensitivity and stability of the sensor. Remaining fluorine may also accelerate corrosion.

Figure 5A:
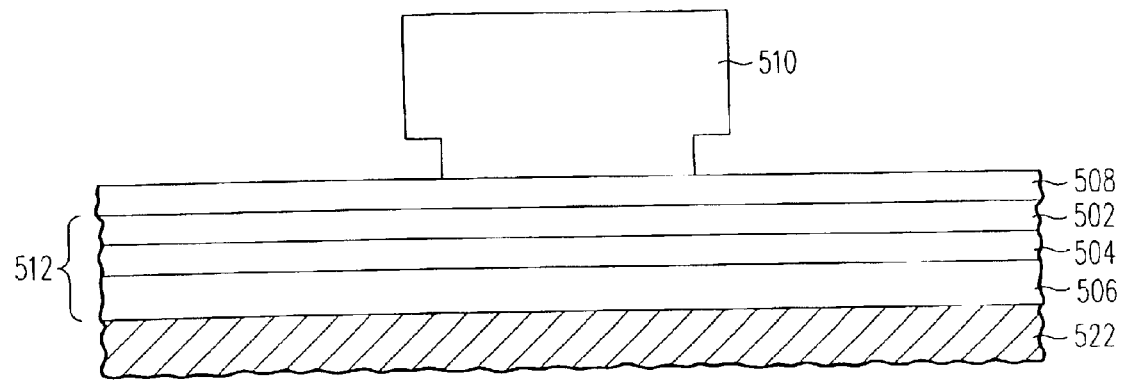
FIG. 5a illustrates a sensor stack with a tantalum cap and a patterned photoresist layer.
Figure 5B:
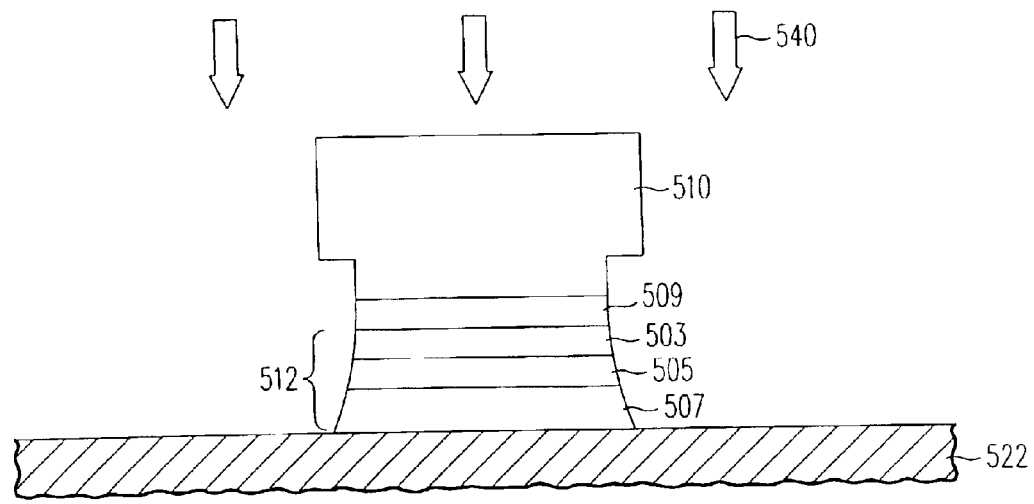
FIG. 5b illustrates the sensor stack after ion milling.

FIGS. 5a–h illustrate a second embodiment of the present invention. FIG. 5a illustrates a sensor stack 512 including a pinned layer 506, a nonmagnetic conducting layer 504, and a free layer 502. The sensor stack 512 has been formed over a substrate 522. The sensor stack 512 is capped with a layer of tantalum 508, and there is a first patterned layer of photoresist 510 formed over the tantalum layer 508. FIG. 5b illustrates the results of performing ion milling 540. The layers 503, 505, 507 of the sensor stack 512 which are directly beneath the photoresist 510 remain after the ion milling step 540, and the portions of the layers not protected by the photoresist 510 are removed.

Figure 5C:
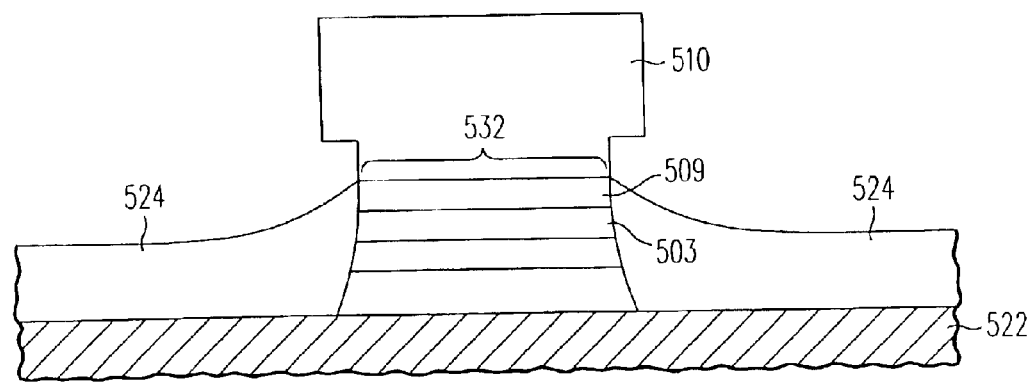
FIG. 5c illustrates the sensor stack after formation of hard bias stabilizers.
Figure 5D:
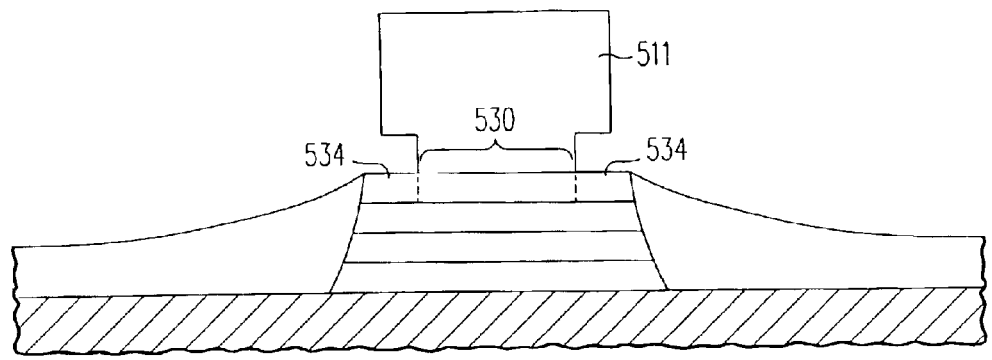
FIG. 5d illustrates a second layer of photoresist after the first layer of photoresist has been removed.

FIG. 5c illustrates the formation of a hard bias layer 524 formed adjacent to the sensor stack 512. The hard bias layer 524 is formed from a permanent magnetic material and provides magnetic stabilization of the free layer 503. FIG. 5d illustrates the results of the removal the first patterned photoresist layer 510 and the addition of a second patterned layer of photoresist 511. The feature width 530 of the second patterned layer of photoresist 511 is smaller than the feature width 532 of the original photoresist 510. The smaller feature width 530 of the second layer of photoresist 511 exposes a small portion 534 of the remaining tantalum layer 509.

Figure 5E:
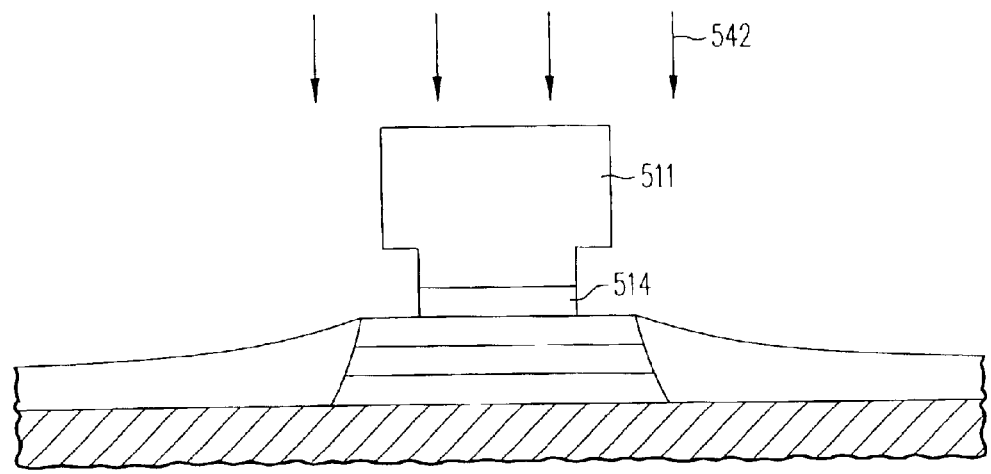
FIG. 5e illustrates the use of a fluorine RIE to remove the exposed tantalum.

Referring to FIG. 5e, the sensor structure is exposed to a fluorine RIE 542 to remove the remaining exposed tantalum. The portion 514 of the tantalum protected by the second layer of photoresist 511 remains after the fluorine RIE 542.

Figure 5F:
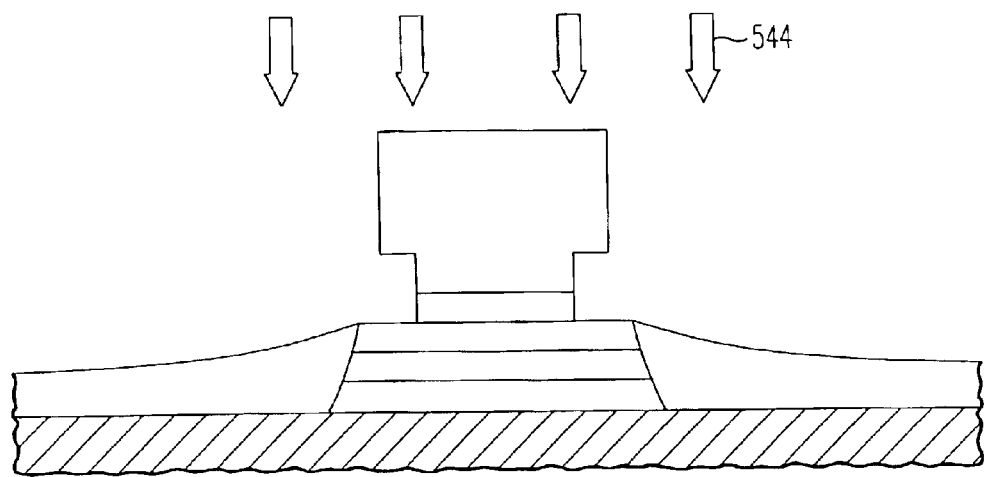
FIG. 5f illustrates the use of an argon/hydrogen RIE treatment to remove any tantalum or fluorine byproducts remaining after the fluorine RIE.

Referring to FIG. 5f, the sensor structure is exposed to an argon/hydrogen RIE treatment 544 to remove any remaining tantalum/fluorine byproducts.

Figure 5G:
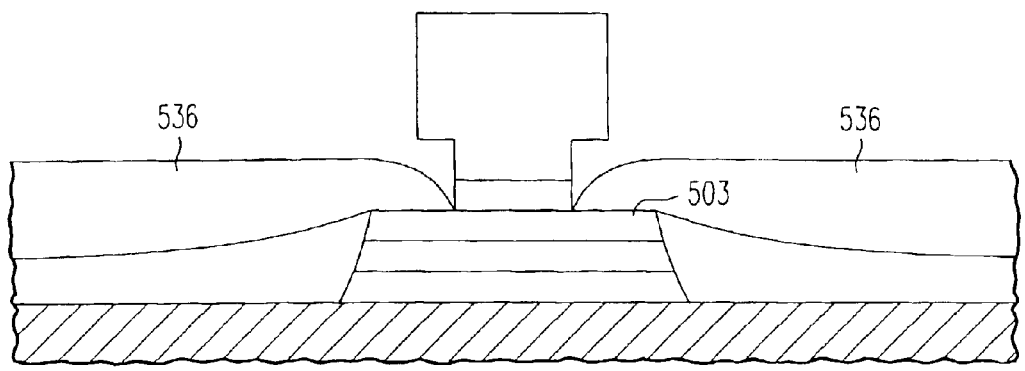
FIG. 5g illustrates the formation of electrical leads.
Figure 5H:
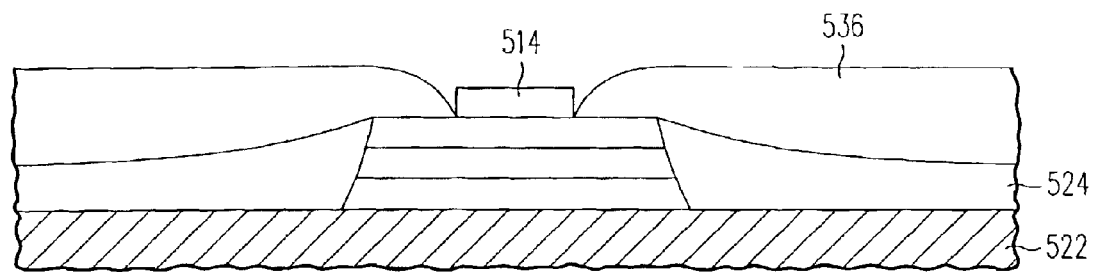
FIG. 5h illustrates the sensor after removal of the second layer of photoresist.

As illustrated in FIG. 5g, leads 536 are formed which overlay a portion of the free layer 503. FIG. 5h illustrates the sensor structure after the second photoresist has been removed.

The sensor illustrated in FIG. 5h is configured so that the electrical leads overlay a portion of the free layer 503. A CIP sensor with such a configuration is sometimes called a lead-overlay sensor.

Two embodiments of the invention were described in detail above for CIP magnetoresistive sensors. The invention is also applicable to CPP sensors since the invention does not depend on the exact form or details of a particular sensor.

Figure 6:
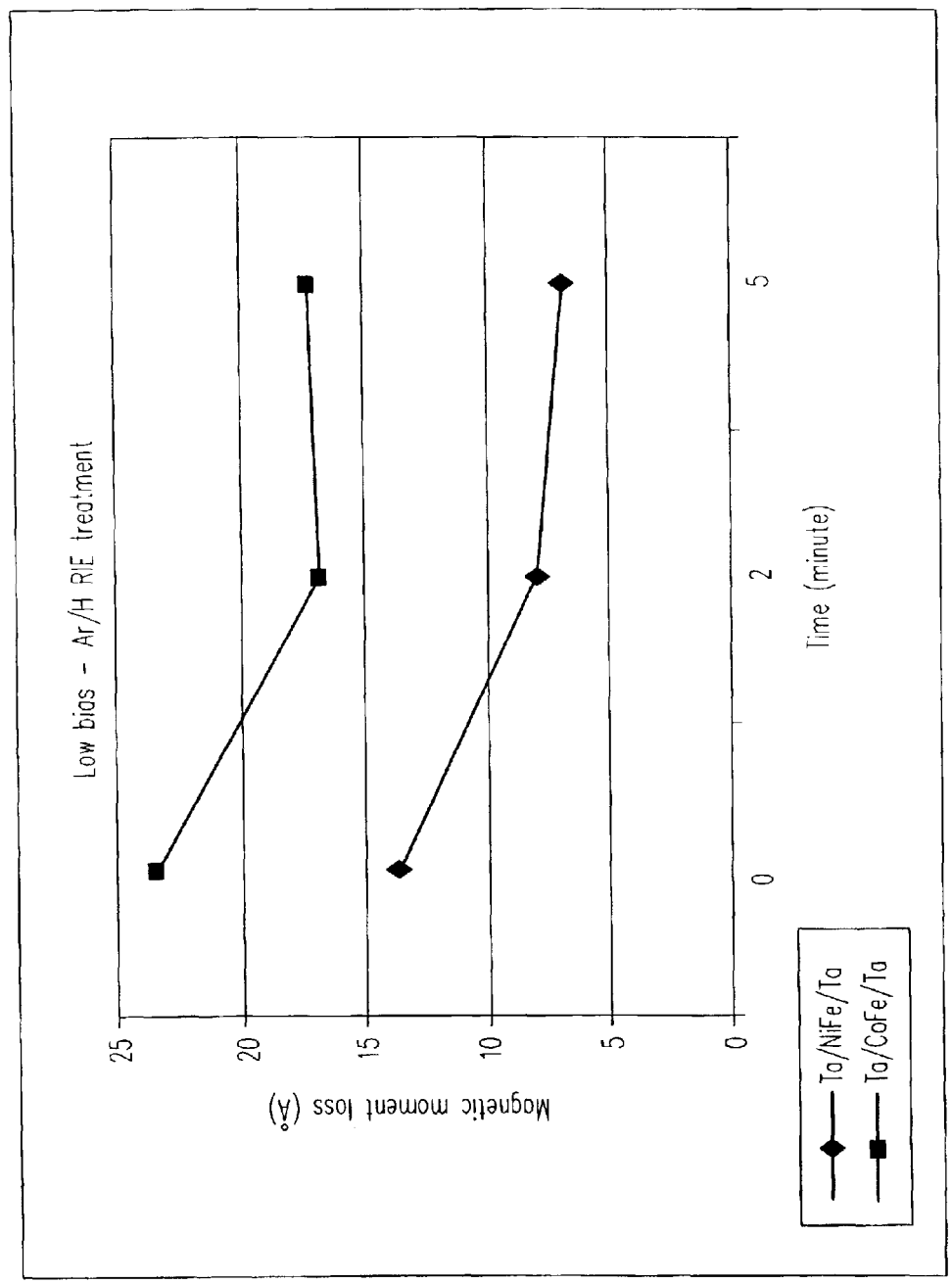
FIG. 6 illustrates a plot of the loss of magnetic moment in test films under different Ar/H RIE treatment exposure times; and, FIG. 7 illustrates a plot of the loss of magnetic moment in magnetoresistive sensors under different fluorine RIE exposure times.

In both of the specific embodiments of the invention described in detail above, the method of using an argon/hydrogen RIE treatment is important to achieve a sensor with high sensitivity. The magnetic moment of the free layer in a magnetoresistive sensor is related to the sensitivity of the sensor. For convenience, the magnetic moment of the free layer is often specified by the equivalent thickness of the free layer. The physical thickness is usually closely related to the equivalent thickness. If an argon/hydrogen RIE treatment is not performed to remove the tantalum/fluorine byproducts from the fluorine RIE, then the magnetic moment of the free layer is reduced. FIG. 6 illustrates the utility of performing an argon/hydrogen RIE treatment to minimize the damage from the residual fluorine byproducts. Free layers are typically formed from alloys of nickel-iron, cobalt-iron, or sandwiches of both. In order to test the utility of the argon/hydrogen RIE, non-annealed sets of test films of nickel-iron and separately cobalt-iron were formed. A layer of tantalum was formed over the test films. The original magnetic moment of both test films, expressed as equivalent thickness, was roughly 100 Angstroms. A thickness of 30 Angstroms is a typical value for the free layer thickness in contemporary sensors. Both test films were then subjected to a fluorine RIE to remove the tantalum layer. One group of test films did not receive an argon/hydrogen RIE treatment. Another group of test films received two minutes of argon/hydrogen RIE treatment, and a third group of test films received five minutes of exposure to an argon/hydrogen RIE treatment.

As illustrated in FIG. 6, the loss in magnetic moment for a cobalt-iron film after removing a tantalum cap with no subsequent argon/hydrogen RIE treatment is about 24 Angstroms. With an argon/hydrogen RIE treatment of either two minutes or five minutes, the loss in magnetic moment for the cobalt-iron film was about 16 Angstroms. The nickel-iron films are more robust against moment loss compared to the cobalt-iron films. With no argon/hydrogen RIE treatment, the loss in moment of the nickel-iron film was about 14 Angstroms. With an argon/hydrogen RIE treatment of either 2 minutes or 5 minutes, the loss of moment in the nickel-iron film was only about 7 Angstroms. In all cases, the use of an argon/hydrogen RIE treatment after the removal of tantalum cap with a fluorine RIE significantly reduced the amount of magnetic moment loss in the films. In order to minimize the moment loss of the free layer to maximize the sensitivity of the sensor, it is preferable to construct the free layer such that nickel-iron is in direct contact with the tantalum cap and to perform an argon/hydrogen RIE treatment after the tantalum cap is removed.

Figure 7:
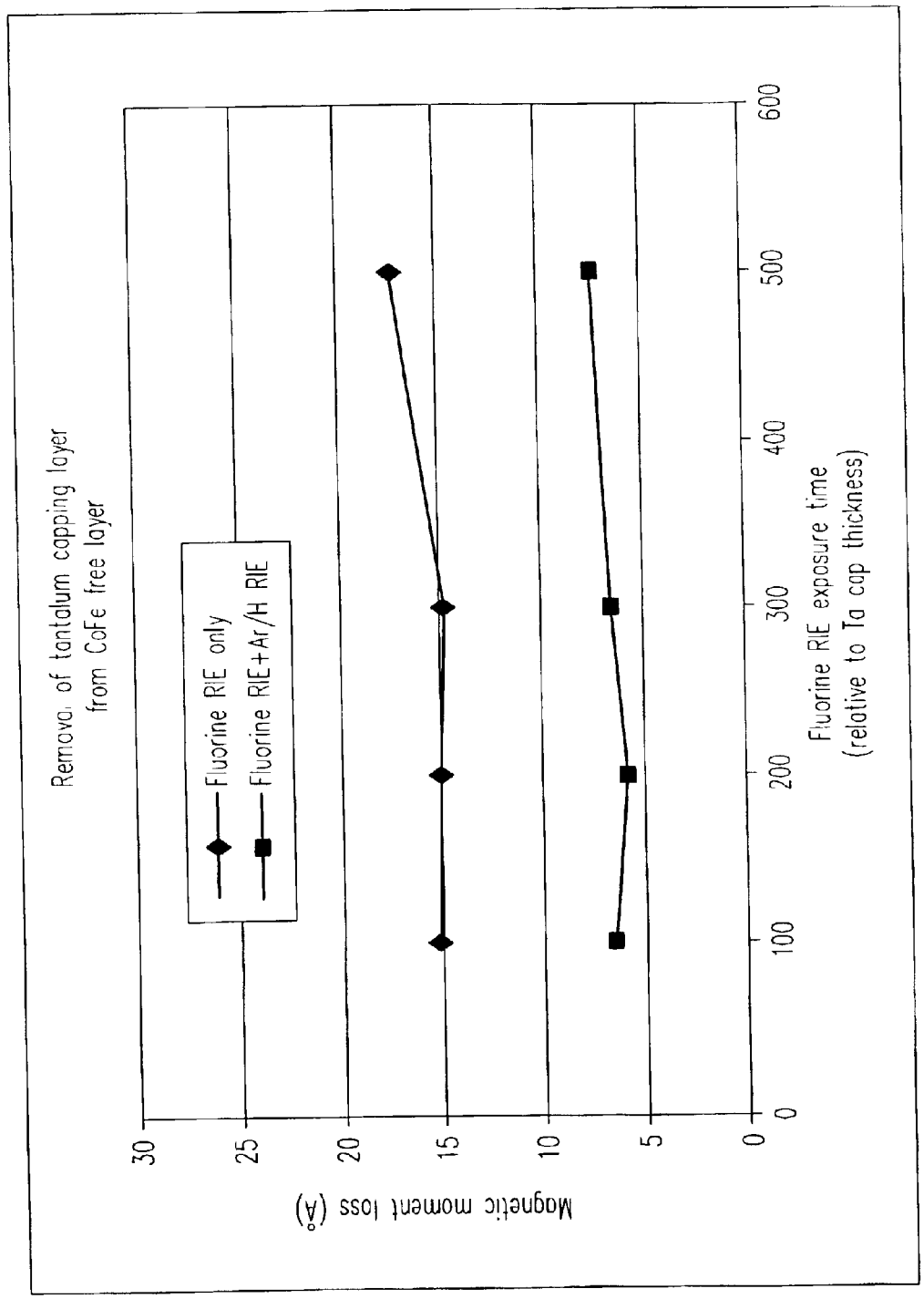

FIG. 7 illustrates further the utility of using a fluorine RIE followed by an argon/hydrogen RIE treatment. Several GMR sensors were fabricated including annealing. In each case, a tantalum layer was formed over a ferromagnetic CoFe free layer. The magnetic moment of all the free layers was equivalently 30 Angstroms. The length of time that the samples were exposed to the fluorine RIE was varied to determine if excess exposure resulted in more damage to the free layer. In FIG. 7 the amount of time is expressed as the equivalent time required to remove the tantalum cap layer. For example, a time of 100% was the time required to only remove the tantalum capping layer; a time of 200% represents twice the time required to remove the tantalum capping layer. The data in FIG. 7 illustrates the magnetic moment loss in the free layer is rather insensitive to the amount of time the films are exposed to the fluorine RIE. This is an indication of the selectivity of the fluorine RIE for tantalum removal. However, the data in FIG. 7 also indicates that about half of the moment of the free layer is lost if the fluorine RIE is not followed by an argon/hydrogen RIE treatment. However, if an argon/hydrogen RIE treatment is performed after the fluorine RIE then the moment loss is substantially less, about 6 Angstroms or about 20%. The 20% loss in moment is substantially less that a loss of 50% and indicates further the advantages of using an argon/hydrogen RIE treatment following a fluorine RIE.

Two specific embodiments of using a method provided by the invention have been described in detail above. From these examples it will be appreciated that a method provided by the invention can be applied to a number of different magnetoresistive sensors which have a ferromagnetic layer adjacent to a tantalum capping layer. These sensors can be used in such applications as readback sensors in magnetic recording or as sensors in MRAM storage devices.

We claim:

1. A method for removing a tantalum cap on a magnetoresistive sensor, comprising:

forming a magnetoresistive stack;

forming a tantalum cap on said magnetoresistive stack;

removing said tantalum cap with a fluorine reactive ion etch; and, treating the magnetoresistive sensor with an argon/hydrogen reactive ion etch.

2. A method as in claim 1, wherein:

said fluorine reactive ion etch is achieved by using a a mixture of $CHF_3$ and $CF_4$ with a pressure of less than 10 mTorr.

3. A method as in claim 2, wherein:

said $CHF_3$ is in the range of about 0 to 50 sccm; and, said $CF_4$ is in the range of about 10 to 40 sccm.

4. A method as in claim 1, wherein:

said argon/hydrogen reactive ion etch treatment is achieved with a pressure of less than 150 mTorr.

5. A method as in claim 1, wherein:

said argon/hydrogen reactive ion etch treatment is achieved with a gas composition of at least 2% hydrogen.

6. A method for removing a tantalum cap on a CIP magnetoresistive sensor, comprising:

forming a magnetoresistive stack;

forming a tantalum cap on said magnetoresistive stack;

removing said tantalum cap with a fluorine reactive ion etch; and, treating the magnetoresistive sensor with an argon/hydrogen reactive ion etch.

7. A method for removing a tantalum cap on a CPP magnetoresistive sensor, comprising:

forming a magnetoresistive stack;

forming a tantalum cap on said magnetoresistive stack;

removing said tantalum cap with a fluorine reactive ion etch; and, treating the magnetoresistive sensor with an argon/hydrogen reactive ion etch.

* * * * *